United States Patent
Goodsitt et al.

(10) Patent No.: US 12,164,867 B1
(45) Date of Patent: Dec. 10, 2024

(54) COMPARING CODE REPOSITORIES

(71) Applicant: Capital One Services, LLC, McLean, VA (US)

(72) Inventors: Jeremy Goodsitt, Champaign, IL (US);
Galen Rafferty, Mahomet, IL (US);
Samuel Sharpe, Cambridge, MA (US);
Brian Barr, Schenectady, NY (US);
Taylor Turner, Richmond, VA (US);
Kenny Bean, Herndon, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 18/356,435

(22) Filed: Jul. 21, 2023

(51) Int. Cl.
*G06F 40/194* (2020.01)
*G06F 40/284* (2020.01)

(52) U.S. Cl.
CPC ......... *G06F 40/194* (2020.01); *G06F 40/284* (2020.01)

(58) Field of Classification Search
CPC ...... G06F 40/194; G06F 40/197; G06F 40/20; G06F 40/284; G06F 40/40
See application file for complete search history.

(56) References Cited

U.S. PATENT DOCUMENTS

| | | | |
|---|---|---|---|
| 2022/0164742 A1 | 5/2022 | Kim et al. | |
| 2022/0309277 A1* | 9/2022 | Shu | G06F 16/35 |
| 2023/0267277 A1* | 8/2023 | Kong | G06F 16/95 706/12 |
| 2023/0401458 A1* | 12/2023 | Ross | G06F 40/279 |

OTHER PUBLICATIONS

Patrik Hrkut et al., Current Trends in the Search for Similarities in Source Codes with an Application in the Field of Plagiarism and Clone Detection, May 24, 2023, The 33rd Conference of Fruct Association, pp. 1-8 (Year: 2023).*

Takashi Ishio et al., Source File Set Search for Clone-and-Own Reuse Analysis, May 1, 2017, International Conference on Mining Software Repositories, pp. 257-268 (Year: 2017).*

* cited by examiner

*Primary Examiner* — Tam T Tran
(74) *Attorney, Agent, or Firm* — Harrity & Harrity, LLP

(57) ABSTRACT

In some implementations, a device may obtain a first document set associated with a first code repository. The device may generate a first embedding set of one or more embeddings for respective documents included in the first document set. The device may obtain a second embedding set of one or more embeddings for respective documents included in a second document set associated with a second code repository. The device may compare the first embedding set to the second embedding set. The device may generate a code repository similarity score that indicates a similarity between the first code repository and the second code repository. The device may perform, based on the code repository similarity score satisfying a threshold, an action associated with the first code repository and/or the second code repository.

20 Claims, 6 Drawing Sheets

COMPARING CODE REPOSITORIES

BACKGROUND

A code repository, also known as a version control system (VCS), may be associated with a software tool that manages changes to code over time. A code repository may be used in software development to keep track of changes made to a codebase, to collaborate between developers, and/or to ensure that different versions of the code are properly maintained, among other examples. A code repository may be a centralized code repository (e.g., where all code is stored on a central server, and developers must connect to the server to access the code) or a distributed code repository (e.g., where each developer has their own copy of the code, and changes can be synchronized between copies). A system associated with a code repository may provide features, such as version control, branching, merging, and/or issue tracking, which make it easier for developers to collaborate and maintain high-quality codebases.

SUMMARY

Some implementations described herein relate to a system for generating similarity scores for code repositories. The system may include one or more memories and one or more processors communicatively coupled to the one or more memories. The one or more processors may be configured to obtain a first document set of one or more documents associated with a first code repository. The one or more processors may be configured to generate a first embedding set of one or more embeddings for respective documents included in the first document set. The one or more processors may be configured to generate document similarity scores for the respective documents included in the first document set based on comparing the first embedding set to a second embedding set of one or more embeddings for respective documents included in a second document set of one or more documents associated with a second code repository. The one or more processors may be configured to generate, based on the document similarity scores, a code repository similarity score that indicates a similarity between the first code repository and the second code repository. The one or more processors may be configured to perform, based on the code repository similarity score satisfying a threshold, an action associated with at least one of the first code repository or the second code repository.

Some implementations described herein relate to a method of comparing code repositories. The method may include obtaining, by a device, a first document set of one or more documents associated with a first code repository. The method may include generating, by the device, a first embedding set of one or more embeddings for respective documents included in the first document set. The method may include obtaining, by the device, a second embedding set of one or more embeddings for respective documents included in a second document set of one or more documents associated with a second code repository. The method may include comparing, by the device, the first embedding set to the second embedding set. The method may include generating, by the device and based on comparing the first embedding set to the second embedding set, a code repository similarity score that indicates a similarity between the first code repository and the second code repository. The method may include performing, by the device and based on the code repository similarity score satisfying a threshold, an action associated with at least one of the first code repository or the second code repository.

Some implementations described herein relate to a non-transitory computer-readable medium that stores a set of instructions. The set of instructions, when executed by one or more processors of a device, may cause the device to obtain a first document set of one or more documents associated with a first code repository. The set of instructions, when executed by one or more processors of the device, may cause the device to generate a first embedding set of one or more embeddings for respective documents included in the first document set. The set of instructions, when executed by one or more processors of the device, may cause the device to generate document similarity scores for the respective documents included in the first document set based on comparing the first embedding set to a second embedding set of one or more embeddings for respective documents included in a second document set of one or more documents associated with a second code repository. The set of instructions, when executed by one or more processors of the device, may cause the device to generate, based on the document similarity scores, a code repository similarity score that indicates a similarity between the first code repository and the second code repository. The set of instructions, when executed by one or more processors of the device, may cause the device to perform, based on the code repository similarity score satisfying a threshold, an action associated with at least one of the first code repository or the second code repository.

DETAILED DESCRIPTION

Figure 1A:
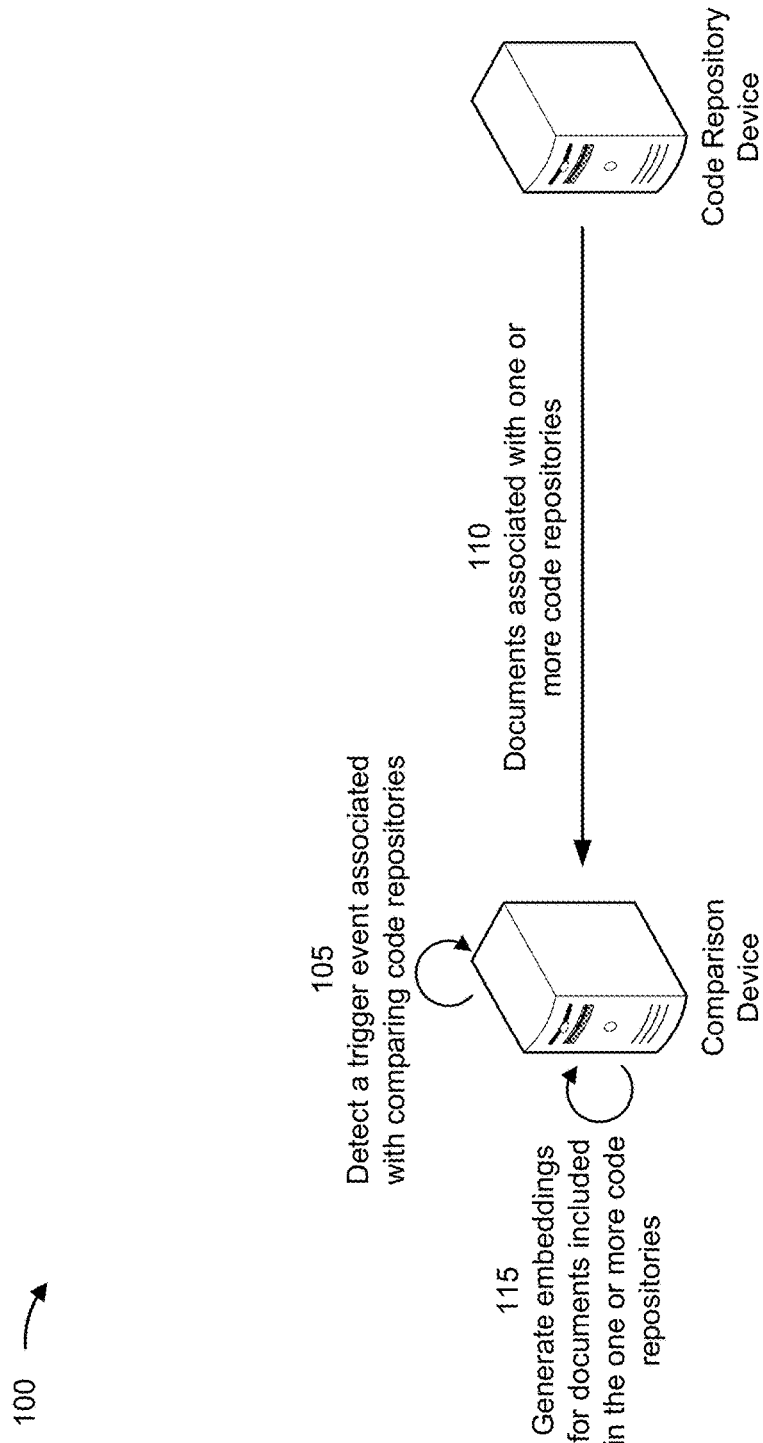
FIGS. 1A-1C are diagrams of an example associated with comparing code repositories, in accordance with some embodiments of the present disclosure.

The following detailed description of example implementations refers to the accompanying drawings. The same reference numbers in different drawings may identify the same or similar elements.

A code repository, also referred to as a version control system (VCS), may be associated with a software tool that manages changes to code over time. A code repository may be used in software development to keep track of changes made to a codebase, to collaborate between developers, and/or to ensure that different versions of the code are properly maintained, among other examples. A code repository may include a variety of documents that support the development, testing, and/or maintenance of a software application. These documents can help ensure that the software application is built correctly, works as intended, and/or is properly licensed and documented, among other examples. As used herein, a "document" included in a code repository may include any document that supports the development, testing, and/or maintenance of software associated with the code repository. "Document" and "file" may be used interchangeably herein.

For example, a code repository may include documents, such as a codebase, one or more files, one or more libraries, source code, one or more text files (e.g., a text file that contains information about the project, such as a "readme" file), one or more license files (e.g., a text file that specifies licensing terms for the software), one or more supporting documents (e.g., technical or user documentation that is associated with understanding and/or using the software, such as user guides, application programming interface (API) documentation, and/or technical specifications, among other examples), one or more configuration files (e.g., files that configure the software to execute in different environments, such as development environments, testing environments, and/or production environments, among other examples), one or more test files (e.g., files that contain automated tests for the software), and/or one or more build files (e.g., files that are used to build the software from source code, such as scripts and/or configuration files that specify how the software should be compiled and packaged), among other examples. A code repository may include multiple documents, and each document may include a large amount of content. For example, a source code file may include hundreds or thousands of lines of code.

An entity may use a code repository system to manage and/or maintain code repositories for respective functions or applications. For example, developers or teams associated with the entity may create or develop codebases for functions or applications, and may store documents and/or files associated with the codebases in a code repository managed by the code repository system. In some cases, different developers and/or teams may develop or create code associated with performing similar, or the same, tasks and/or functions. As a result, code repositories associated with software for performing similar, or the same, tasks and/or functions may be stored via the code repository system. This consumes processing resources, memory resources, and/or network resources associated with generating and/or storing different code repositories associated with software for performing similar, or the same, tasks and/or functions.

Further, the different code repositories may accomplish the similar, or the same, tasks and/or functions in different manners and/or using different techniques. For example, two code repositories may be associated with a function of data cleaning. However, the two code repositories may include different code or different files associated with performing data cleaning. As a result, different developers and/or teams associated with the entity may use different code and/or different software to perform the same function or task. This increases the complexity and difficulty associated with the maintainability of the software associated with performing the function or task, enabling collaboration, maintaining quality, and/or enabling scalability of the software associated with performing the function or task, among other examples. Moreover, maintaining different code and/or different software to perform the same function or task is inefficient.

However, identifying code repositories that are associated with similar, or the same, functions or tasks is difficult. For example, as described elsewhere herein, a code repository may include multiple documents and each document may include a large amount of content. Manual examination or analysis of each document and/or of each code repository associated with an entity may not be feasible due to the significant time overhead and processing overhead associated with navigating through each document or file in the code repositories and analyzing the documents or files. Moreover, some documents, such as source code, may be difficult to analyze and compare using manual (e.g., human) examination.

Some implementations described herein enable a comparison of code repositories. For example, a comparison device may obtain one or more documents associated with one or more respective code repositories. The comparison device may generate one or more embeddings (e.g., one or more embedding vectors) associated with respective documents, files, code functions, application programming interface (API) call information, characters, and/or strings of characters, among other examples (e.g., in a given code repository). The comparison device may compare two code repositories using generated embeddings. For example, the comparison device may compare documents and/or files from a first code repository and a second code repository by comparing respective embeddings of the documents and/or files (e.g., using a Euclidean distance between, or cosine similarity of, the embeddings).

For example, the comparison device may generate document similarity scores for respective documents and/or for respective portions of one or more documents included in the first code repository and the second code repository based on comparing the embeddings (e.g., of two or more code repositories). A document similarity score may indicate a similarity between two or more documents and/or may indicate a similarity between a first portion of a first document and a second portion of the first document or another document. The comparison device may generate a code repository similarity score for the first code repository and the second code repository (e.g., indicating a similarity level between the first code repository and the second code repository) based on comparing the embeddings. For example, the comparison device may aggregate the document similarity scores for respective documents included in the first code repository and the second code repository to obtain the code repository similarity score. The comparison device may perform an action, associated with the first code repository and the second code repository, if the code repository similarity score satisfies a threshold (e.g., if the comparison device determines that the first code repository and the second code repository are similar).

As a result, duplication of work may be quickly and easily identified. This conserves processing resources, memory resources, and/or network resources that would have otherwise been used for generating and/or storing different code repositories associated with software for performing similar, or the same, tasks and/or functions. Additionally, this ensures a uniformity of codebases, documentation, and/or files for software associated with performing similar, or the same, tasks and/or functions. Ensuring uniformity improves the maintainability of the codebases, documentation, and/or files (e.g., when code is uniform, it is easier to maintain and update), improves collaboration (e.g., when code is uniform, it is easier for multiple developers to work together on the same project), improves efficiency (e.g., uniform code can be written more quickly and with fewer errors because developers do not have to spend time figuring out how to structure their code or use different coding conventions), improves quality (e.g., uniform code can help ensure that the code meets high-quality standards and reduces the risk of errors and vulnerabilities that could lead to security breaches, crashes, or other problems), and/or improves scalability (e.g., uniform code can be easier to scale to larger projects or teams because it is easier to manage and understand and makes it easier to integrate new features or technologies into the codebase), among other examples.

Figure 1B:
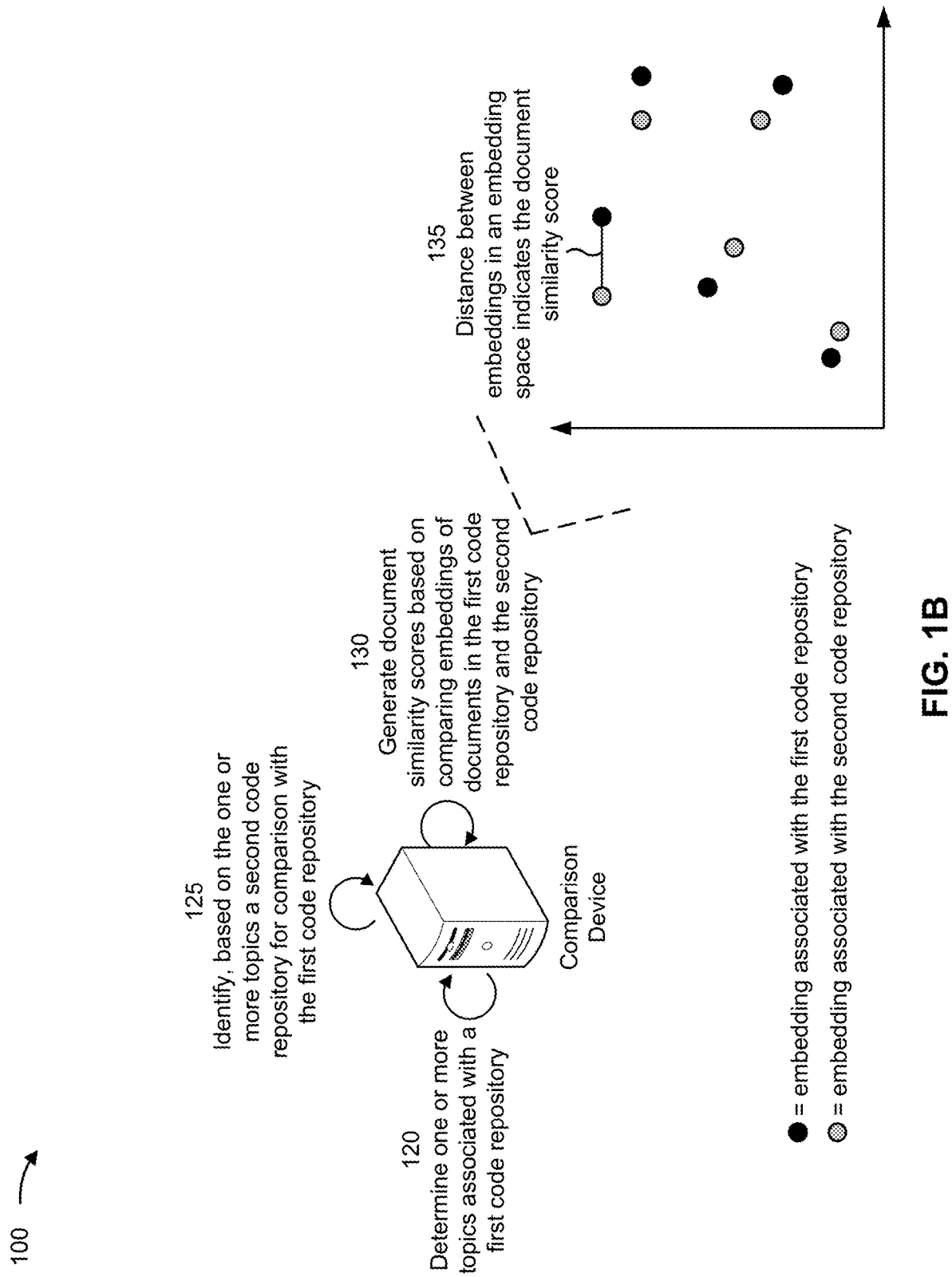
Figure 1C:
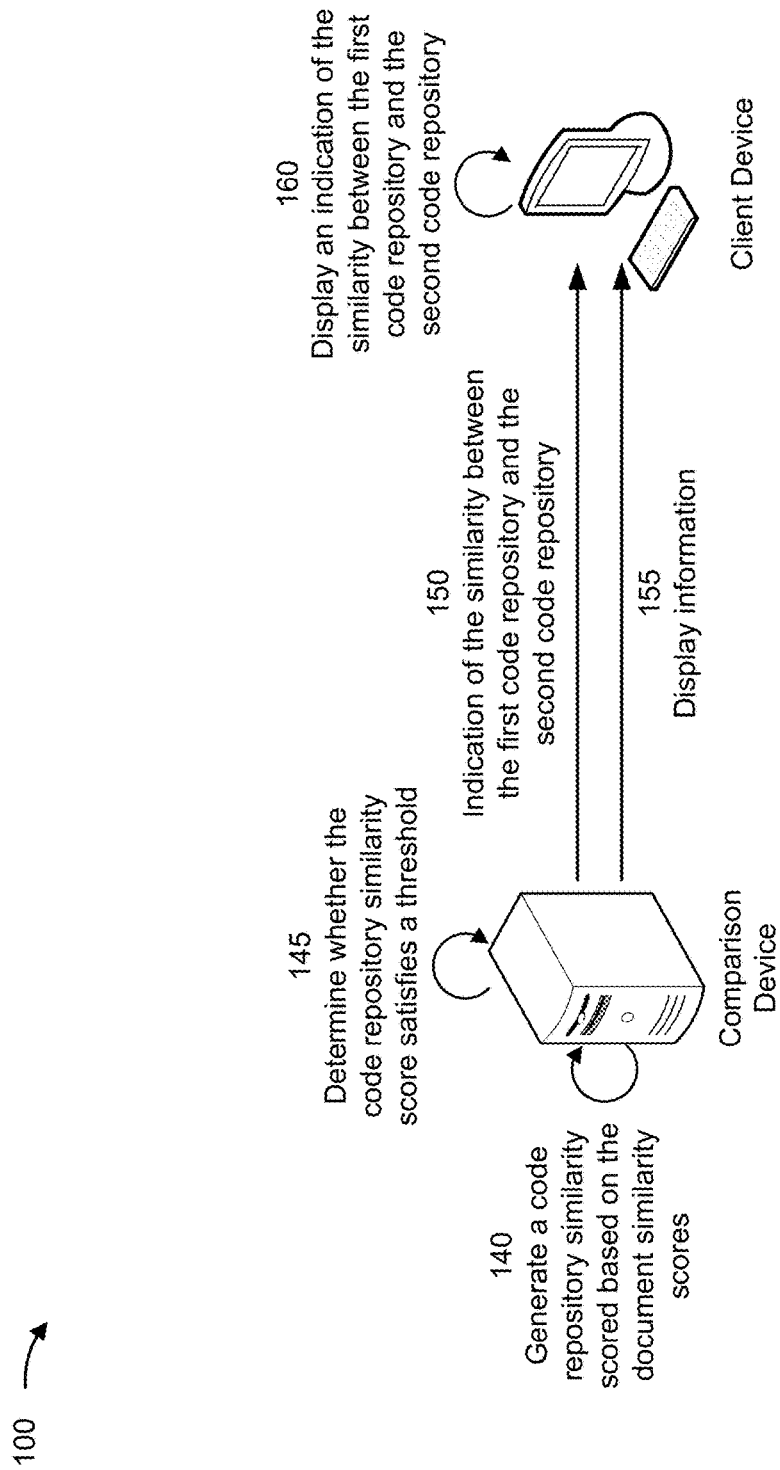

FIGS. 1A-1C are diagrams of an example 100 associated with comparing code repositories. As shown in FIGS. 1A-1C, example 100 includes a comparison device, a code repository device, and a client device. These devices are described in more detail in connection with FIGS. 2 and 3. The code repository device may include (e.g., store or host) one or more code repositories (also known as "software repositories") of an entity. One or more of the code repositories may include one or more documents and/or one or more files, as described elsewhere herein.

As shown in FIG. 1A, and by reference number 105, the comparison device may detect a trigger event associated with comparing code repositories. For example, the trigger event may be associated with a first code repository. The trigger event may be associated with causing the comparison device to compare the first code repository to one or more other code repositories, such as a second code repository, as described in more detail elsewhere herein.

The trigger event may be associated with detecting a creation or a modification associated with one or more documents included in the first code repository. In other words, the comparison device may detect that one or more of the documents included in the first code repository have been created or modified. For example, detecting the trigger event may include detecting a commit operation or a push operation associated with the first code repository. For example, the code repository device may store changes to code in a series of snapshots, called commits. Each commit may include a unique identifier, a timestamp, and/or a description of the changes made, among other examples. Developers can create branches in a code repository, which allow them to work on separate versions of the code without affecting the main branch. Once changes have been made, the changes can be merged back into the main branch via a commit or a push operation.

Additionally, or alternatively, detecting the trigger event may include detecting a pull request associated with the first code repository. A pull request may be a way for developers to propose changes to the codebase. When a pull request is created, other developers can review the changes and provide feedback. Once the changes have been approved, the changes can be merged into a main branch of the first code repository. In some implementations, detecting the trigger event may include detecting a request to duplicate the first code repository (e.g., a fork request).

In some implementations, the trigger event may be associated with an amount of time that the first code repository has been stored via the code repository device. For example, the comparison device may compare the first code repository to one or more other code repositories after the first code repository has been stored via the code repository device for a given amount of time. As another example, the comparison device may periodically compare the first code repository to one or more other code repositories.

As shown by reference number 110, the comparison device may obtain, from the code repository device, documents associated with one or more code repositories. For example, the comparison device may obtain the documents based on, or in response to, detecting the trigger event. The comparison device may obtain one or more documents included in the first code repository. For example, the comparison device may transmit, and the code repository device may receive, a request for the documents associated with one or more code repositories. The code repository device may transmit, and the comparison device may receive, the documents associated with one or more code repositories in response to the request. In some implementations, the comparison device may retrieve and/or download the documents associated with one or more code repositories from a memory associated with the code repository device.

As described elsewhere herein, the documents associated with one or more code repositories may include code files, configuration files, and/or other documents associated with maintaining, supporting, and/or explaining code and/or software. For example, the documents may include a codebase, one or more code files, one or more configuration files, one or more libraries, one or more support documents (e.g., technical or user documentation that is associated with understanding and/or using the software, such as user guides, API documentation, and/or technical specifications, among other examples), source code, one or more text files, one or more license files, one or more test files, and/or one or more build files, among other examples.

As shown by reference number 115, the comparison device may generate one or more embeddings for one or more respective documents included in the one or more code repositories. For example, the comparison device may generate one or more embeddings for one or more respective documents included in the first code repository. An embedding (also referred to as an embedding vector) may be a mapping of a discrete (e.g., categorical) variable to a vector (e.g., an embedding vector) of numbers (e.g., continuous numbers). For example, embeddings may be low dimensional, learned continuous vector representations of discrete variables. In other words, embeddings are numerical representations of objects, such as words or images, that are learned by deep learning algorithms from large amounts of data. The embeddings may be high-dimensional, meaning they consist of a large number of features. For example, a model may generate word embeddings (e.g., that enable words with similar meanings to have a similar representation in an embedding space). For example, word embeddings may enable individual words to be represented as real-valued vectors in a predefined embedding space. Each word or phrase (e.g., a set of words) may be mapped to one embedding vector, and the embedding vector values may be learned in a way that resembles how a neural network learns.

For example, the comparison device may generate the one or more embeddings using a machine learning model. The machine learning model may be trained to generate a numerical representation of a document that captures the document's meaning and context. The machine learning model may be any machine learning model configured to generate embeddings or embedding vectors for documents and/or portions of documents (e.g., code functions, characters, strings of characters, portions of a file, or other portions of a document) associated with code repositories. For example, the machine learning model may include a "bidirectional encoder representations from transformers" (BERT) model, a Word2vec model, a "global vectors for word representation" (GloVe) model, a residual network (ResNet) model, and/or an autoencoder model, among other examples.

In some implementations, the comparison device may generate the one or more embeddings by tokenizing the document into individual images, words, phrases, and/or sub-words. Each token may be assigned an embedding vector by providing the token to the machine learning algorithm (e.g., where the output of the machine learning algorithm is the embedding vector). The machine learning algorithm may consider the context in which each token appears in the document, as well as the contexts of neighboring tokens, to generate a contextual embedding for each token. In some implementations, the comparison device may generate document similarity scores based on each token and/or sets of tokens of a document (or multiple documents).

In some implementations, the comparison device may aggregate the resulting embeddings for all the tokens in the document to generate a single embedding vector that represents the entire document. The comparison device may aggregate the embeddings by taking the mean or max of the token embeddings and/or by using attention mechanisms to give more weight to certain tokens or to specific parts of the document. By capturing the meaning and context of a document in a numerical representation, the embeddings enable machine learning models and/or the comparison device to understand and process the documents included in code repositories more effectively.

In some implementations, the comparison device may plot the embeddings of the document in a graph (e.g., in an embedding space). The embeddings may be an embedding of a given document and/or embeddings of portions of a given document (e.g., intra-document embeddings). The graph may be referred to as an embedding graph. An embedding graph may be a graph representation of high-dimensional vectors. An embedding graph may represent high-dimensional embeddings in a lower-dimensional space, such as in two or three dimensions, using techniques such as principal component analysis (PCA) or t-distributed stochastic neighbor embedding (t-SNE), among other examples. For example, the comparison device may generate an embedding graph indicating one or more embeddings for respective documents included in the first code repository. By visualizing the embeddings in a lower-dimensional space, the comparison device may gain insights into the relationships between the objects or documents that the embeddings represent, as described in more detail elsewhere herein.

As shown in FIG. 1B, and by reference number 120, the comparison device may determine one or more topics associated with the first code repository. For example, the comparison device may analyze the one or more documents included in the first code repository to determine the one or more topics. In some implementations, the comparison device may determine one or more topics associated with the first code repository based on the embeddings associated with the one or more documents included in the first code repository. For example, the comparison device may use a clustering or classification machine learning model that operates using embeddings of the documents included in the first code repository. For example, the clustering or classification machine learning model may include a k-means clustering model, a hierarchical clustering model, and/or a support vector machines (SVM) model, among other examples. The clustering or classification machine learning model may be configured and/or trained to map the embeddings of the documents to a closest topic or cluster in a learned space (e.g., the learned space may be a transformed representation of the original data (e.g., the embeddings) where each data point is mapped to a new feature space to better capture the underlying patterns and structure of the data). The clustering or classification machine learning model may be configured and/or trained to assign a document and/or the first code repository to that topic or cluster. By using embeddings to represent the documents, the comparison device can capture the document's semantic and contextual meaning in a numerical form that can be processed by machine learning models. This enables the comparison device to group similar documents together, identify topics of the documents and/or code repositories, and perform other tasks more effectively, as described in more detail elsewhere herein. Additionally, or alternatively, the comparison device may perform one or more natural language processing (NLP) operations to analyze the documents. The comparison device may determine the one or more topics based on the NLP analysis of the documents.

Additionally, or alternatively, the one or more topics may be indicated via a user input. For example, when creating the first code repository, a user may input one or more topics associated with the first code repository. In such examples, the comparison device may obtain an indication of the one or more topics as part of obtaining the documents associated with the first code repository (e.g., as described above in connection with reference number 110).

The comparison device may store an indication of the one or more topics associated with the first code repository. For example, the comparison device may store a tag, label, or marker, among other examples, indicating the one or more topics associated with the first code repository. In some implementations, the comparison device may cause the code repository device to store the indication of the one or more topics associated with the first code repository (e.g., in a memory associated with the code repository device, such as the memory where the first code repository is stored). The comparison device may determine and/or store topics associated with other code repositories in a similar manner as described above.

As shown by reference number 125, the comparison device may identify, based on the one or more topics, a second code repository for similarity comparisons with the first code repository. For example, the comparison device may identify one or more other code repositories (e.g., the second code repository) that are associated with the same, or similar, topics as the one or more topics associated with the first code repository. For example, the comparison device may search, using the one or more topics as a search term, a set of code repositories to identify candidate code repositories to compare to the first code repository. This conserves processing resources, memory resources, and/or computing resources, among other examples, that would have otherwise been used to compare the first code repository to all code repositories included in the set of code repositories. In other words, the one or more topics may be used as a filter to identify candidate code repositories that have a higher likelihood of being similar to the first code repository, thereby reducing the quantity of comparisons to be performed by the comparison device.

As shown by reference number 130, the comparison device may generate document similarity scores for documents included in the first code repository and the second code repository. A document similarity score may indicate a level of similarity between two (or more) documents. For example, a higher document similarity score may indicate that two (or more) documents are more similar, whereas a lower document similarity score may indicate that the two (or more) documents are less similar.

In some implementations, the comparison device may compare the documents included in the first code repository to the documents included in the second code repository. In some implementations, the comparison device may compare each document in the first code repository to each document included in the second code repository. For example, if the first code repository includes a document 1, a document 2, and a document 3, and the second code repository includes a document 4, a document 5, and a document 6, then the code repository device may compare the document 1 to the document 4, the document 1 to the document 5, the document 1 to the document 6, the document 2 to the document 4, the document 2 to the document 5, the document 2 to the document 6, the document 3 to the document 4, the document 3 to the document 5, and the document 3 to the document 6. In some implementations, the code repository device may compare portions of a given document to other portions of the given document (e.g., intra-document comparisons). For example, the code repository device may compare a first one or more portions of the document 1 to a second one or more portions of the document 1. As another example, the code repository device may compare portions of a first document to portion(s) of a second document (e.g., where the second document is included in the same code repository or a different code repository as the first document). The comparison device may generate a document similarity score for each comparison.

In some implementations, the comparison device may identify document similarity scores that satisfy a document similarity threshold. For example, from the comparisons, the comparison device may identify embeddings having a high level of similarity (e.g., associated with a document similarity score that satisfies the document similarity threshold). This enables the comparison device to identify documents and/or portions of documents having a high level of similarity. In some implementations, the comparison device may provide, to the client device or another device, an indication of the embeddings, documents, and/or portions of the documents associated with document similarity scores that satisfy a document similarity threshold (e.g., via the display information described in more detail elsewhere herein). This may enable a user to quickly and easily identify the embeddings, documents, and/or portions of the documents that are associated with a high level of similarity. This conserves time, processing resources, and/or computing resources, among other examples, that would have otherwise been used by the user to navigate through all documents and/or through a given document to identify the portions of the document(s) that are similar.

In some implementations, the comparison device may compare documents associated with the same, or similar, type or category. In other words, rather than comparing each document in the first code repository to all documents included in the second code repository, the comparison device may only compare a given document in the first code repository to document(s) included in the second code repository that are associated with the same, or similar, type or category as the given document. For example, the comparison device may compare code file(s) in the first code repository to code file(s) in the second code repository, may compare configuration file(s) in the first code repository to configuration file(s) in the second code repository, and/or may compare supporting document(s) in the first code repository to supporting document(s) in the second code repository. This conserves processing resources and/or computing resources that would have otherwise been used to compare each document in the first code repository to all documents included in the second code repository.

In some implementations, the comparison device may compare singular documents to singular documents (e.g., on a one-to-one basis). Additionally, or alternatively, the comparison device may compare a first group of documents to a second group of documents (e.g., on a group-to-group basis or a many-to-many basis). For example, the comparison device may compare a first embedding (e.g., associated with a first group of documents included in the first one or more documents and/or in the first code repository) to a second embedding (e.g., associated with a second group of documents included in the second one or more documents and/or the second code repository), as described in more detail elsewhere herein. For example, the comparison device may group documents based on a document type or category (e.g., may group code files together, configuration files together, supporting documents together, and so on). The comparison device may generate one or more embeddings for a group of documents in a similar manner as described elsewhere herein (e.g., by aggregating embeddings for respective documents included in the group to obtain one or more embeddings that represent the group).

In some implementations, the comparison device may identify a highest document similarity score (e.g., a similarity score indicating a highest level of similarity) from one or more document similarity scores associated with the document. The comparison device may assign the highest document similarity score to the document. For example, referring back to the example provided above, for the document 1, the comparison device may determine that the comparison of the document 1 to the document 4 has a document similarity score of 95, the comparison of the document 1 to the document 5 has a document similarity score of 20, and the comparison of the document 1 to the document 6 has a document similarity score of 5. Assuming that a higher document similarity score indicates a higher level of similarity, the comparison device may determine that the document similarity score for the document 1 (and the document 4) is 95. The comparison device may determine document similarity scores for other documents included in the first code repository and the second code repository in a similar manner.

In some implementations, the comparison device may compare the documents based on comparing a first one or more embeddings of the documents included in the first code repository to a second one or more embeddings of the documents included in the second code repository. The comparison device may generate the second one or more embeddings of the documents included in the second code repository in a similar manner as described elsewhere herein. Additionally, or alternatively, the comparison device may obtain or retrieve the second one or more embeddings of the documents included in the second code repository from memory. For example, a document similarity score for a comparison between a first document and a second document may be based on a comparison of one or more embeddings of the first document to one or more embeddings of the second document.

For example, as shown by reference number 135, a distance between embeddings in an embedding space (e.g., in an embedding graph) may indicate the document similarity score for documents associated with the embeddings. For example, the comparison device may compare points in one or more embedding graphs to identify similarities between the first code repository and the second code repository. In some implementations, the document similarity score may be the distance. In other implementations, the document similarity score may be based on the distance (e.g., a larger distance may result in a lower document similarity score). The distance may be a Euclidean distance, among other examples.

In some implementations, the comparison device may compare embedding graphs of the first code repository and the second code repository. For example, the comparison device may use one or more metrics to compare embeddings in a first embedding graph (e.g., associated with the first code repository) to embeddings in a second embedding graph (e.g., associated with the second code repository). The document similarity score may be based on the one or more metrics.

The one or more metrics may include a Euclidean distance, a cosine similarity, a Jaccard similarity, and/or a clustering metric, among other examples. For example, a Euclidean distance may indicate a similarity between two (or more) documents. For example, if the Euclidean distance between two embeddings is small, this may indicate that the two vectors are similar, and the documents or words they represent are likely to be related in some way. If the Euclidean distance is large, then the embeddings may be dissimilar, and the documents or words are likely to be unrelated. Cosine similarity may be a measure of similarity between two high-dimensional vectors may calculating a cosine of an angle between the between two high-dimensional vectors. For example, cosine similarity may be a measure of similarity that ranges from −1 to 1, where 1 indicates that the embeddings are identical, 0 indicates that the embeddings are orthogonal (i.e., unrelated), and −1 indicates that the embeddings are diametrically opposed. If the cosine similarity between two embeddings is close to 1, this may indicate that the two embeddings are similar, and the documents or words they represent are likely to be related in some way (e.g., resulting in a higher document similarity score). If the cosine similarity is close to 0, the embeddings may be dissimilar, and the documents or words are likely to be unrelated (e.g., resulting in a lower document similarity score).

As shown in FIG. 1C, and by reference number 140, the comparison device may generate a code repository similarity score indicating a similarity level between the first code repository and the second code repository. In some implementations, the comparison device may generate the code repository similarity score based on the document similarity scores. For example, the comparison device may aggregate the document similarity scores to generate the code repository similarity score. In some implementations, the comparison device may average the document similarity scores to generate the code repository similarity score. As another example, the code repository similarity score may be a mean or a median of the document similarity scores. In some implementations, the comparison device may aggregate document similarity scores for the first set of one or more documents (e.g., a first document set) or the second set of one or more documents (e.g., a second document set) at one or more levels. The one or more levels may include different levels of granularity of a code repository. For example, the comparison device may aggregate document similarity scores at a first level (e.g., at a document level, indicating similarity within or between document(s)), a second level (e.g., at a file level, indicating similarity within or between document(s) in a file), and/or at a third level (e.g., at a code repository level, indicating similarity within or between document(s) and/or files in a code repository or multiple code repositories), among other examples. Aggregating the document similarity scores at different levels may provide beneficial insight into the parts or portions of code repositories having high levels of similarity. This may conserve time, processing resources, and/or computing resources that would have otherwise been used by a user to identify the parts or portions of code repositories having high levels of similarity if the document similarity scores were only aggregated at one level (e.g., at the code repository level).

Additionally, or alternatively, the comparison device may generate the code repository similarity score based on comparing an embedding graph associated with the first code repository to an embedding graph associated with the second code repository. For example, the comparison device may compare an overall structure of the embedding graphs to determine the code repository similarity score. For example, the comparison device may use a clustering model, such as a k-means model or hierarchical clustering, to compare the overall structure of the two graphs. By comparing the clusters formed by the two graphs, the comparison device may identify similarities and differences in the semantic content of the documents or words they represent. For example, the comparison device may generate the code repository similarity score based on comparing the clusters formed by the two graphs.

Additionally, or alternatively, the comparison device may generate the code repository similarity score based on identifying duplications associated with the first code repository and/or the second code repository. For example, the comparison device may identify one or more forks associated with, or one or more dependencies between, the first code repository and the second code repository. The comparison device may generate the code repository similarity score based on the one or more forks or the one or more dependencies. For example, forks or dependencies between two code repositories may be an indication that the code repositories are similar, share common documents, and/or are associated with performing a similar task or function. Therefore, the comparison device may use the one or more forks associated with, or one or more dependencies between, the first code repository and the second code repository to generate the code repository similarity score (e.g., if the one or more forks or one or more dependencies are detected or identified, then the code repository similarity score may indicate a greater level of similarity between the first code repository and the second code repository).

As shown by reference number 145, the comparison device may determine whether the code repository similarity score satisfies a threshold. For example, if the code repository similarity score satisfies the threshold, then the comparison device may determine that the first code repository and the second code repository are similar. If the code repository similarity score does not satisfy the threshold, then the comparison device may determine that the first code repository and the second code repository are not similar.

As shown in FIG. 1C, the comparison device may perform one or more actions based on the code repository similarity score satisfying the threshold. For example, if the code repository similarity score does not satisfy the threshold, then the comparison device may not perform any additional actions or operations associated with the first code repository and the second code repository. However, if the code repository similarity score satisfies the threshold, then the comparison device may perform one or more actions. For example, as shown by reference number 150, the one or more actions may include the comparison device providing or transmitting, and the client device obtaining or receiving, an indication of the similarity between the first code repository and the second code repository. In some implementations, the comparison device may provide or transmit, and the client device may obtain or receive, a message identifying the second code repository and indicating the similarity between the first code repository and the second code repository.

For example, the comparison device may provide the indication to a management account address associated with an entity (e.g., the entity associated with the first code repository and the second code repository). This may enable a manager to review and analyze the first code repository and the second code repository for consolidation and/or collaboration opportunities. As another example, the comparison device may provide the indication to a developer address associated with the first code repository. This may enable a developer to identify duplicated work and/or collaboration opportunities. For example, this may enable the developer to identify duplicated work while in the process of developing the first code repository. This may enable the developer to conserve time, processing resources, memory resources, and/or computing resources that would have otherwise been used to continue to develop the first code repository. Further, this enables the developer to ensure a uniformity in code in a function or application associated with the first code repository and the second code repository.

The indication of the similarity may include an indication of the similarity score. For example, the indication of the similarity score may indicate that the first code repository and the second code repository have a similarity score of X or that the first code repository is X % similar to the second code repository. In other implementations, the indication of the similarity score may identify the first code repository and the second code repository (e.g., may indicate storage locations in the code repository device and/or uniform resource locators (URLs) of the first code repository and the second code repository) and indicate that the first code repository and the second code repository are similar.

In some implementations, the one or more actions may include automatically consolidating or combining the first code repository and the second code repository. For example, the comparison device may identify one or more pairs of documents (e.g., where a pair includes one or more documents from the first code repository and one or more documents from the second code repository) associated with a document similarity score that satisfies a consolidation threshold (e.g., pairs of documents that are identical or that have a high degree of similarity). The comparison device may cause only one copy of the document(s) included in the one or more pairs of documents to be stored (e.g., in the code repository device). As another example, the comparison device may combine the first code repository and the second code repository by causing only one copy of the document(s) included in the one or more pairs of documents to be stored in the combined code repository. This conserves memory resources that would have otherwise been used to store multiple copies of identical documents or documents having a high degree of similarity.

In some implementations, the or more actions may include storing the graph(s) of documents and/or code repositories that are similar (e.g., as described in more detail elsewhere herein). For example, the comparison device may generate and/or maintain a network or database of graphs (e.g., embedding graphs) for documents and/or code repositories that are similar. The comparison device may use the network or database of graphs for future searches to identify similar documents and/or code repositories. For example, the comparison device may generate an embedding graph for a new document. The comparison device may use the embedding graph to search the network or database of graphs for similar embedding graphs (e.g., to identify documents and/or code repositories that are similar to the new document). This improves the efficiency and reduces the complexity of searching for similar documents and/or code repositories.

In some implementations, as shown by reference number 155, the comparison device may transmit, and the client device may receive, display information. The display information may cause a user interface to be displayed by the client device. For example, as shown by reference number 160, the client device may display the user interface (e.g., in response to receiving the display information). The user interface may include an indication of the similarity between the first code repository and the second code repository. For example, the user interface may include an indication of the similarity score for the first code repository and the second code repository. In some implementations, the user interface may include a graph (e.g., an embedding graph) or another visual indicator to show document similarity scores of documents included in the first code repository and the second code repository. The user interface may indicate similarities between the first code repository and other code repositories (e.g., in addition to the second code repository). For example, the comparison device may determine a similarity score between the first code repository and other code repositories in a similar manner as described herein. The user interface may indicate similarities between the first code repository and multiple code repositories.

As indicated above, FIGS. 1A-1C are provided as an example. Other examples may differ from what is described with regard to FIGS. 1A-1C.

Figure 2:
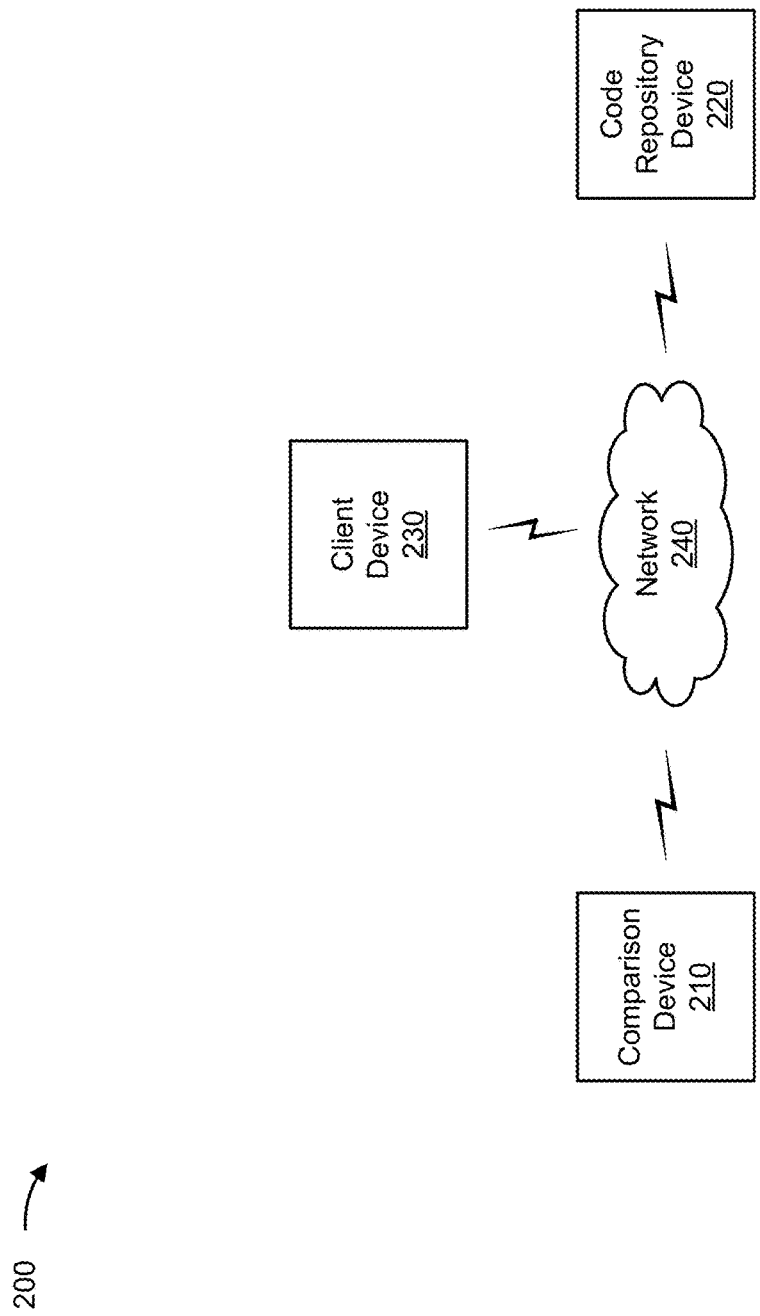
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a comparison device 210, a code repository device 220, a client device 230, and a network 240. Devices of environment 200 may interconnect via wired connections, wireless connections, or a combination of wired and wireless connections.

The comparison device 210 may include one or more devices capable of receiving, generating, storing, processing, providing, and/or routing information associated with comparing code repositories, as described elsewhere herein. The comparison device 210 may include a communication device and/or a computing device. For example, the comparison device 210 may include a server, such as an application server, a client server, a web server, a database server, a host server, a proxy server, a virtual server (e.g., executing on computing hardware), or a server in a cloud computing system. In some implementations, the comparison device 210 may include computing hardware used in a cloud computing environment.

The code repository device 220 may include one or more devices capable of receiving, generating, storing, processing, providing, and/or routing information associated with comparing code repositories, as described elsewhere herein. The code repository device 220 may include a communication device and/or a computing device. For example, the code repository device 220 may include a server, such as an application server, a client server, a web server, a database server, a host server, a proxy server, a virtual server (e.g., executing on computing hardware), or a server in a cloud computing system. In some implementations, the code repository device 220 may include computing hardware used in a cloud computing environment. The code repository device 220 may be associated with a provider of a software development service and/or a version control service.

The client device 230 may include one or more devices capable of receiving, generating, storing, processing, and/or providing information associated with comparing code repositories, as described elsewhere herein. The client device 230 may include a communication device and/or a computing device. For example, the client device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
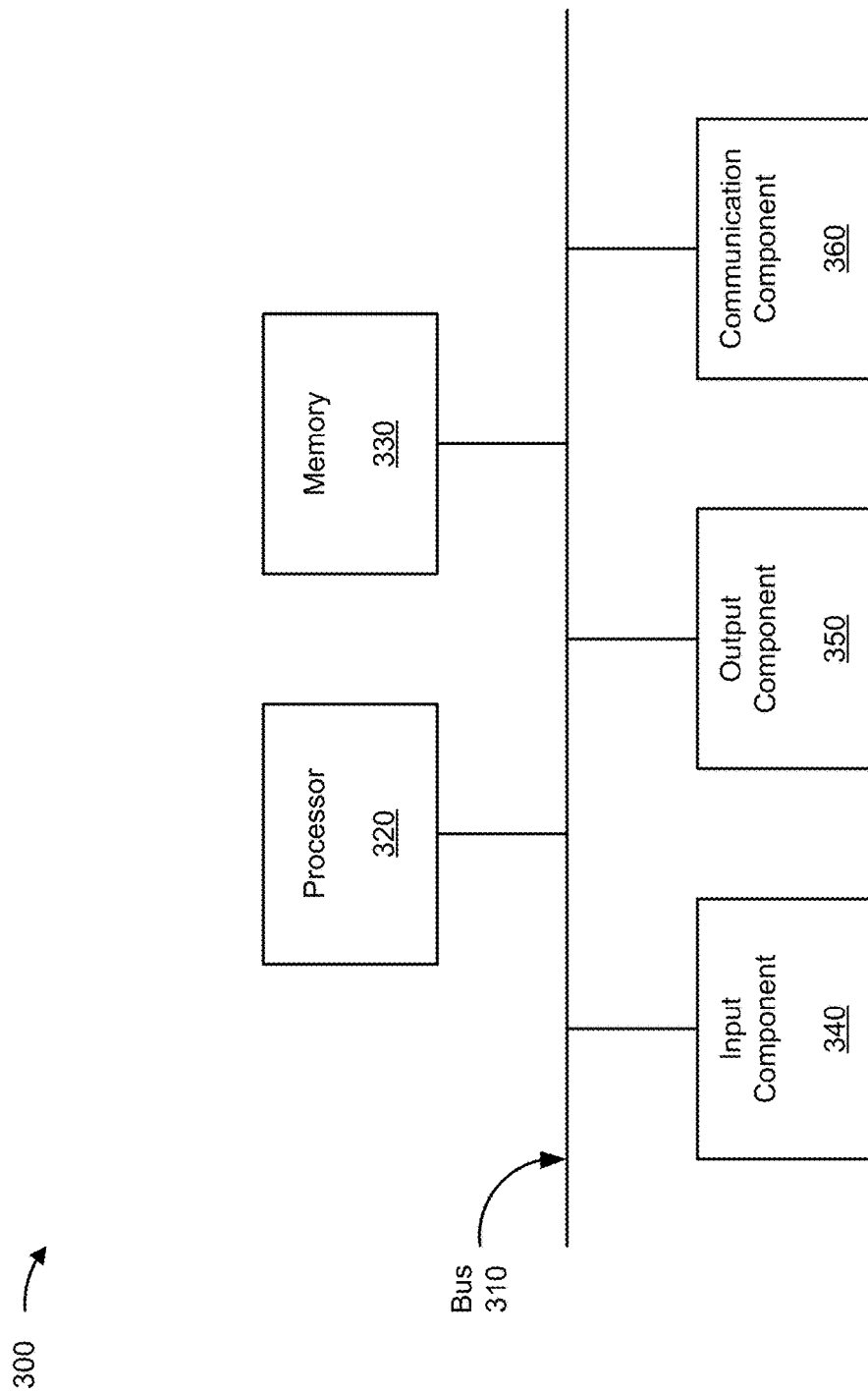
FIG. 3 is a diagram of example components of a device associated with comparing code repositories, in accordance with some embodiments of the present disclosure.

FIG. 3 is a diagram of example components of a device 300 associated with comparing code repositories. The device 300 may correspond to the comparison device 210, the code repository device 220, and/or the client device 230. In some implementations, the comparison device 210, the code repository device 220, and/or the client device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
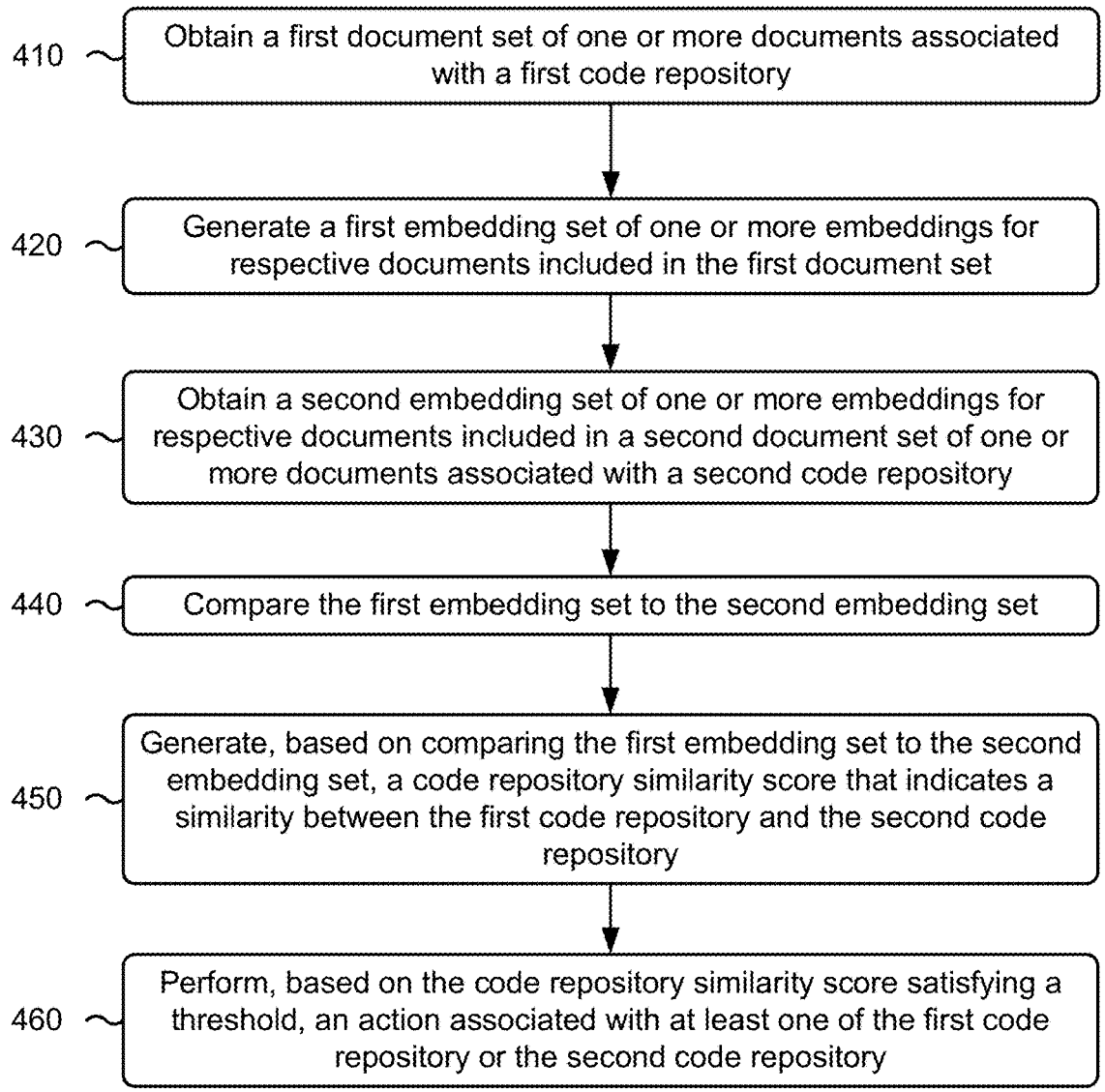
FIG. 4 is a flowchart of an example process associated with comparing code repositories, in accordance with some embodiments of the present disclosure.

FIG. 4 is a flowchart of an example process 400 associated with comparing code repositories. In some implementations, one or more process blocks of FIG. 4 may be performed by the comparison device 210. In some implementations, one or more process blocks of FIG. 4 may be performed by another device or a group of devices separate from or including the comparison device 210, such as the code repository device 220, and/or the client device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining a first document set of one or more documents associated with a first code repository (block 410). For example, the comparison device 210 (e.g., using processor 320 and/or memory 330) may obtain a first document set of one or more documents associated with a first code repository, as described above in connection with reference number 110 of FIG. 1A. As an example, the first code repository may include code files, configuration files, and/or other documents associated with maintaining, supporting, and/or explaining code and/or software. For example, the one or more documents may include a codebase, one or more code files, one or more configuration files, one or more libraries, one or more support documents (e.g., technical or user documentation that is associated with understanding and/or using the software, such as user guides, API documentation, and/or technical specifications, among other examples), source code, one or more text files, one or more license files, one or more test files, and/or one or more build files, among other examples.

As further shown in FIG. 4, process 400 may include generating a first embedding set of one or more embeddings for respective documents included in the first document set (block 420). For example, the comparison device 210 (e.g., using processor 320 and/or memory 330) may generate a first embedding set of one or more embeddings for respective documents included in the first document set, as described above in connection with reference number 115 of FIG. 1A. As an example, an embedding (also referred to as an embedding vector) may be a mapping of a discrete (e.g., categorical) variable to a vector (e.g., an embedding vector) of continuous numbers. For example, embeddings may be low dimensional, learned continuous vector representations of discrete variables. In other words, the comparison device 210 may generate one or more embeddings that are numerical representations of objects, such as words or images, that are included in the first document set.

As further shown in FIG. 4, process 400 may include obtaining a second embedding set of one or more embeddings for respective documents included in a second document set of one or more documents associated with a second code repository (block 430). For example, the comparison device 210 (e.g., using processor 320 and/or memory 330) may obtain a second embedding set of one or more embeddings for respective documents included in a second document set associated with a second code repository, as described above in connection with reference number 125 of FIG. 1B. As an example, the comparison device 210 may obtain and/or generate one or more embeddings that are numerical representations of objects, such as words or images, that are included in the second document set.

As further shown in FIG. 4, process 400 may include comparing the first embedding set to the second embedding set (block 440). For example, the comparison device 210 (e.g., using processor 320 and/or memory 330) may compare the first embedding set to the second embedding set, as described above in connection with reference number 130 of FIG. 1B. As an example, the comparison device 210 may generate document similarity scores for respective comparisons of documents in the first document set and the second document set by comparing the first embedding set to the second embedding set. For example, a metric associated with two or more embeddings in an embedding space (e.g., in an embedding graph) may indicate the document similarity score for documents associated with the two or more embeddings. The metric may include a Euclidean distance, a cosine similarity, a Jaccard similarity, and/or a clustering metric, among other examples. The comparison (e.g., document similarity scores) of the first embedding set to the second embedding set may be based on the metric.

As further shown in FIG. 4, process 400 may include generating, based on comparing the first embedding set to the second embedding set, a code repository similarity score that indicates a similarity between the first code repository and the second code repository (block 450). For example, the comparison device 210 (e.g., using processor 320 and/or memory 330) may generate, based on comparing the first embedding set to the second embedding set, a code repository similarity score that indicates a similarity between the first code repository and the second code repository, as described above in connection with reference number 140 of FIG. 1C. As an example, the comparison device 210 may aggregate document similarity scores (e.g., that are based on the comparison of the first embedding set to the second embedding set) to generate the code repository similarity score.

As further shown in FIG. 4, process 400 may include performing, based on the code repository similarity score satisfying a threshold, an action associated with at least one of the first code repository or the second code repository (block 460). For example, the comparison device 210 (e.g., using processor 320 and/or memory 330) may perform, based on the code repository similarity score satisfying a threshold, an action associated with at least one of the first code repository or the second code repository, as described above in connection with reference numbers 150 and/or 155 of FIG. 1C. As an example, the action may include providing or transmitting a notification to another device (e.g., the client device 230) and/or causing information indicating the similarity between the first code repository and the second code repository to be displayed (e.g., by the client device 230).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating similarity scores for code repositories, the system comprising:
   one or more memories; and
   one or more processors, communicatively coupled to the one or more memories, configured to:
   obtain a first document set of one or more documents associated with a first code repository;
   generate a first embedding set of one or more embeddings for respective documents included in the first document set;
   generate document similarity scores for the respective documents included in the first document set based on comparing the first embedding set to a second embedding set of one or more embeddings for respective documents included in a second document set of one or more documents associated with a second code repository;
   generate, based on the document similarity scores, a code repository similarity score that indicates a similarity between the first code repository and the second code repository; and
   perform, based on the code repository similarity score satisfying a threshold, an action associated with at least one of the first code repository or the second code repository.

2. The system of claim 1, wherein the one or more processors are further configured to:
   analyze the first document set of to determine one or more topics associated with the first code repository; and
   store an indication of the one or more topics as a tag associated with the first code repository.

3. The system of claim 2, wherein the one or more processors are further configured to:
   search, using the one or more topics, a set of code repositories to identify one or more candidate code repositories for similarity comparisons with the first code repository,
   wherein the one or more candidate code repositories include the second code repository.

4. The system of claim 1, wherein the one or more processors, to generate the document similarity scores, are configured to:
   generate a document similarity score indicting a similarity between a first document, included in the first document set, and a second document, included in the second document set, based on a Euclidean distance between a first embedding associated with the first document and a second embedding associated with the second document.

5. The system of claim 1, wherein the one or more processors, to generate the document similarity scores, are further configured to:
   generate a document similarity score indicting a similarity between a first portion of a first document, included in the first document set or the second document set, and a second portion of the first document.

6. The system of claim 1, wherein the one or more processors, to perform the action, are further configured to:
   provide, to an address associated with a management account of the first code repository and the second code repository, an indication of the similarity between the first code repository and the second code repository.

7. The system of claim 1, wherein the one or more processors, to perform the action, are further configured to:
   provide, to an account associated with the first code repository, a message identifying the second code repository and indicating the similarity between the first code repository and the second code repository.

8. The system of claim 1, wherein the first document set include at least one of:
   a codebase,
   a code file,
   a configuration file,
   a library, or
   a support document.

9. A method of comparing code repositories, comprising:
   obtaining, by a device, a first document set of one or more documents associated with a first code repository;
   generating, by the device, a first embedding set of one or more embeddings for respective documents included in the first document set;
   obtaining, by the device, a second embedding set of one or more embeddings for respective documents included in a second document set of one or more documents associated with a second code repository;

comparing, by the device, the first embedding set to the second embedding set;

generating, by the device and based on comparing the first embedding set to the second embedding set, a code repository similarity score that indicates a similarity between the first code repository and the second code repository; and performing, by the device and based on the code repository similarity score satisfying a threshold, an action associated with at least one of the first code repository or the second code repository.

10. The method of claim 9, wherein obtaining the first document set associated with the first code repository comprises:

detecting that one or more of the first document set have been created or modified in the first code repository; and obtaining the first document set based on detecting that the one or more of the first document set have been created or modified.

11. The method of claim 9, wherein comparing the first embedding set to the second embedding set is based on cosine similarities between the first embedding set and the second embedding set.

12. The method of claim 9, wherein comparing the first embedding set to the second embedding set comprises:

generating a graph that includes the first embedding set and the second embedding set; and comparing points in the graph to identify similarities between the first document set and the second document set.

13. The method of claim 9, wherein generating the code repository similarity score comprises:

identifying one or more forks associated with, or one or more dependencies between, the first code repository and the second code repository; and generating the code repository similarity score based on the one or more forks or the one or more dependencies.

14. The method of claim 9, wherein obtaining the second embedding set for respective documents included in the second document set associated with the second code repository comprises:

identifying, based on the first document set, one or more topics associated with the first code repository; and identifying the second code repository based on the second code repository being associated with at least one of the one or more topics.

15. The method of claim 9, wherein generating the code repository similarity score comprises:

generating document similarity scores for respective documents included in the first document set and the second document set based on comparing the first embedding set to the second embedding set; and aggregating the document similarity scores to obtain the code repository similarity score.

16. The method of claim 15, wherein aggregating the document similarity scores comprises:

aggregating document similarity scores for the first document set or the second document set at one or more levels.

17. The method of claim 9, wherein comparing the first embedding set to the second embedding set comprises:

comparing a first embedding, from the first embedding set, to a second embedding from the second embedding set, wherein the first embedding is associated with a first group of documents included in the first document set, and wherein the second embedding is associated with a second group of documents included in the second document set.

18. A non-transitory computer-readable medium storing a set of instructions, the set of instructions comprising:

one or more instructions that, when executed by one or more processors of a device, cause the device to:

obtain a first document set of one or more documents associated with a first code repository;

generate a first embedding set for respective documents included in the first document set;

generate document similarity scores for the respective documents included in the first document set based on comparing the first embedding set to a second embedding set for respective documents included in a second document set of one or more documents associated with a second code repository;

generate, based on the document similarity scores, a code repository similarity score that indicates a similarity between the first code repository and the second code repository; and perform, based on the code repository similarity score satisfying a threshold, an action associated with at least one of the first code repository or the second code repository.

19. The non-transitory computer-readable medium of claim 18, wherein the one or more instructions further cause the device to:

determine, based on the first document set, one or more topics associated with the first code repository.

20. The non-transitory computer-readable medium of claim 18, wherein the one or more instructions, that cause the device to perform the action, cause the device to:

provide, to another device, an indication of the similarity between the first code repository and the second code repository.

* * * * *